E. GRAY.
Printing-Telegraph.

No. 168,249.

Patented Sept. 28, 1875.

5 Sheets--Sheet 1.

WITNESSES
F. A. Herring
W. F. Harback

INVENTOR
Elisha Gray
By Gridley & Warner
att'ys

E. GRAY.
Printing-Telegraph.

No. 168,249.

5 Sheets--Sheet 3.

Patented Sept. 28, 1875.

WITNESSES
F. H. Herring
W. F. Haubach

INVENTOR
Elisha Gray
By Gridley & Warner
Attys

5 Sheets--Sheet 4.

E. GRAY.
Printing-Telegraph.

No. 168,249. Patented Sept. 28, 1875.

WITNESSES
F. A. Herring
W. F. Harbach

INVENTOR
Elisha Gray
By Gridley & Warner
Attys

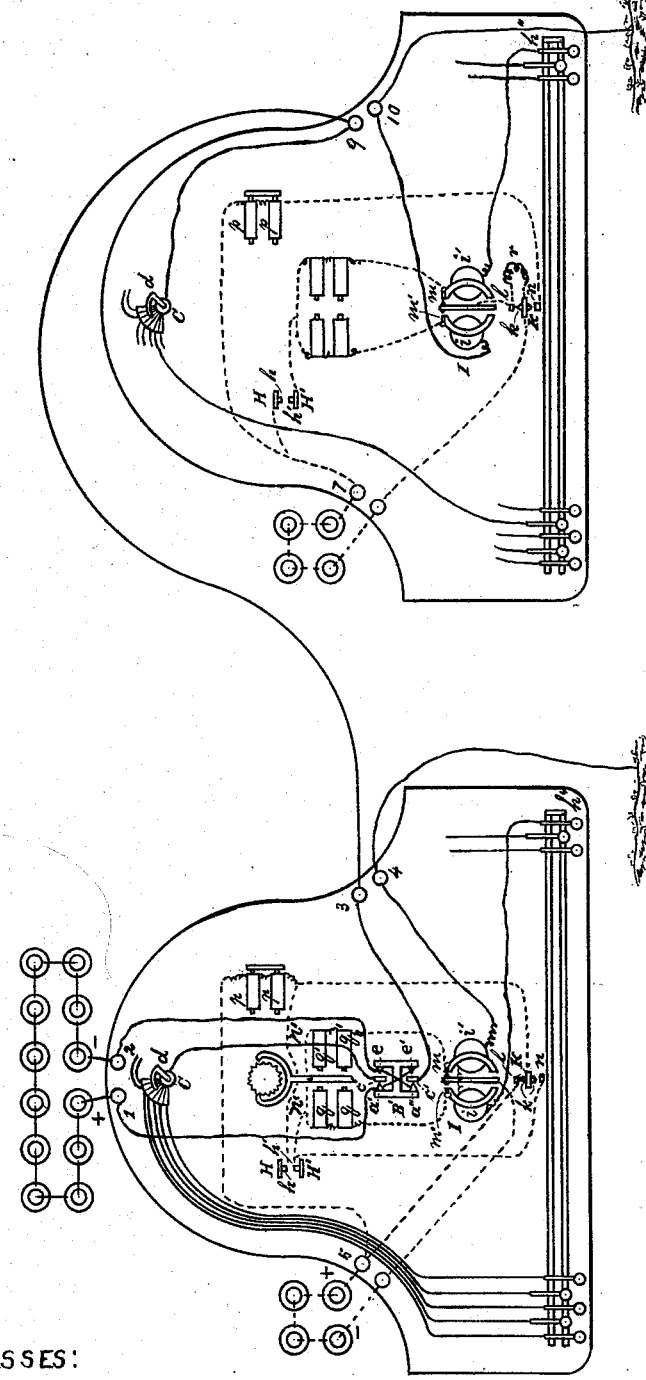

UNITED STATES PATENT OFFICE.

ELISHA GRAY, OF CHICAGO, ILLINOIS.

IMPROVEMENT IN PRINTING-TELEGRAPHS.

Specification forming part of Letters Patent No. 168,249, dated September 28, 1875; application filed June 1, 1874.

*To all whom it may concern:*

Be it known that I, ELISHA GRAY, of Chicago, in the county of Cook and State of Illinois, have invented certain new and useful Improvements in Printing - Telegraph Instruments, of which improvements the following is a full, clear, and exact description, which will enable others skilled in the art to which my invention appertains to make and use the same, reference being had to the accompanying drawing and chart forming a part hereof, and in which—

Figure 1:
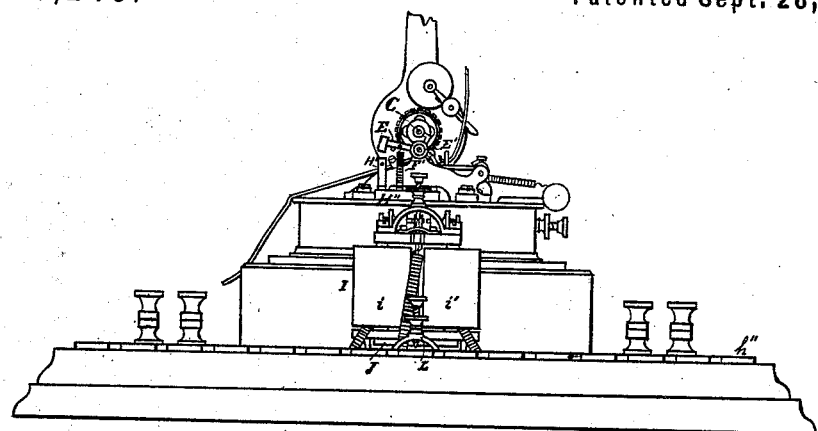
Figure 2:
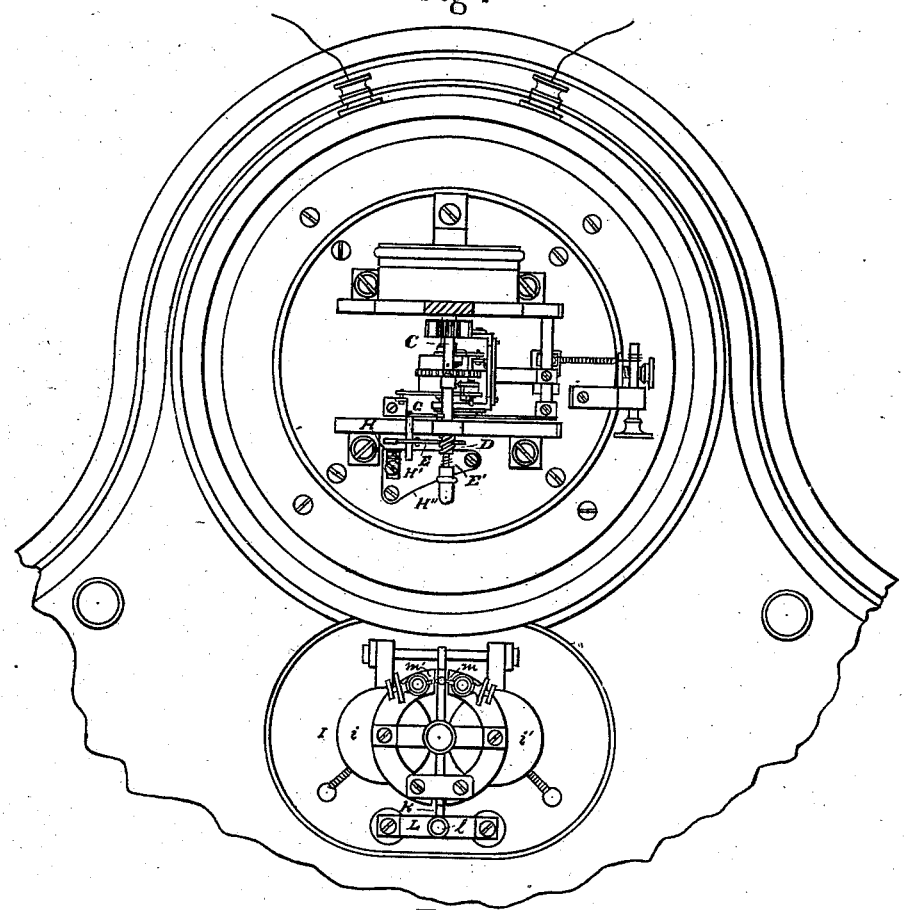
Figure 3:
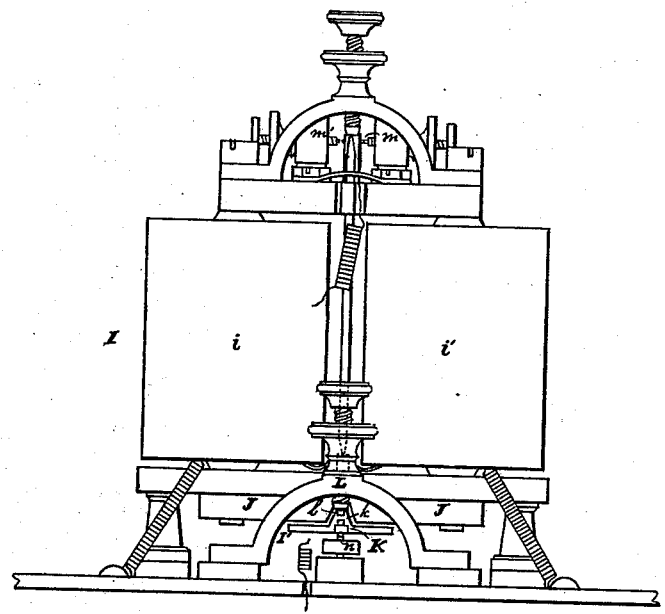
Figure 4:
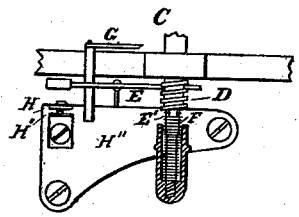
Figure 5:
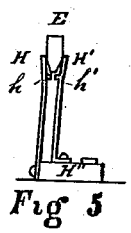
Figure 6:
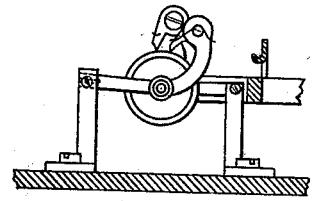
Figure 7:
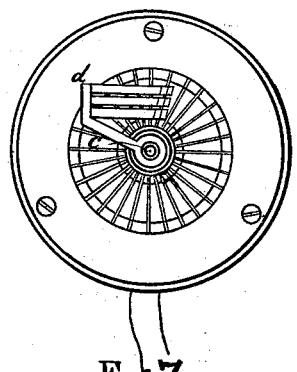
Figure 8:
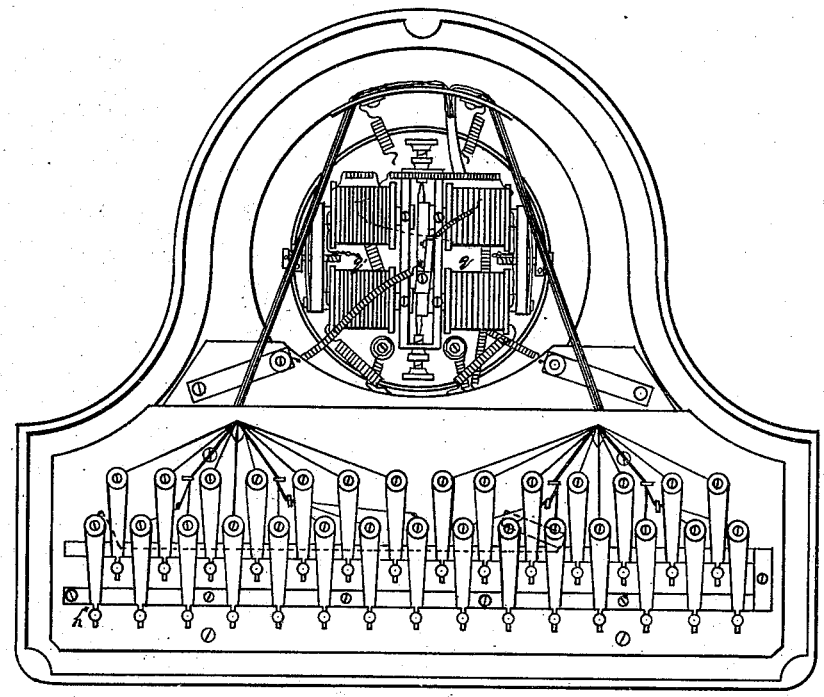
Figure 9:
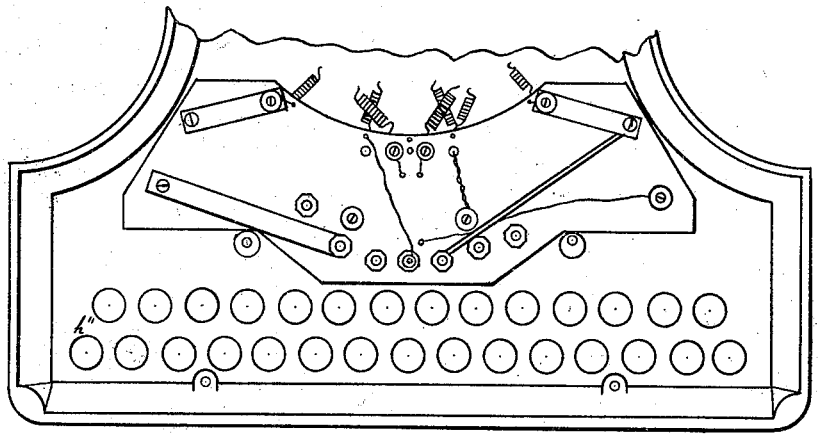
Figure 10:
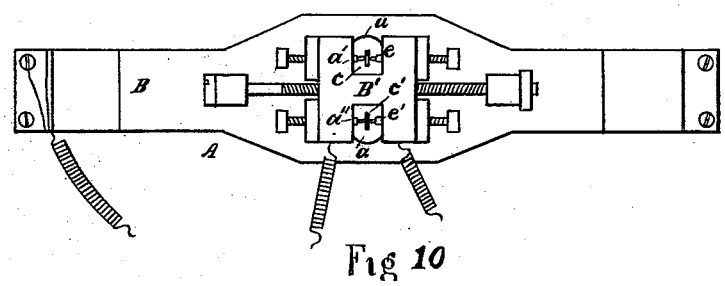
Figure 11:
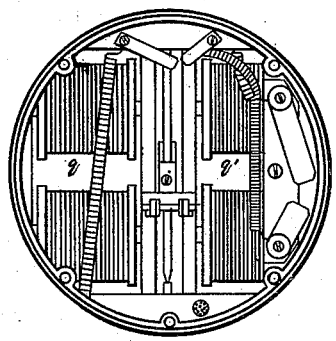
Figure 12:
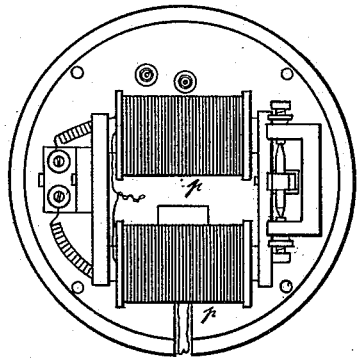

Figure 1, Plate 1, is a front elevation of a printing-telegraph instrument provided with my improvements; Fig. 2, Plate 1, a top view of a part of the same; Fig. 3, Plate 2, a front elevation of the polarized relay and Morse armature; Fig. 4, Plate 2, a top view of the unison device and stopper; Fig. 5, Plate 2, an end elevation of the same; Fig. 6, Plate 2, a side elevation of the feeding mechanism; Fig. 7, Plate 2, a rear elevation of the "sunflower;" Fig. 8, Plate 3, a bottom view of the instrument; Fig. 9, Plate 3, a like view of a part of the same, the key-board being removed; Fig. 10, Plate 4, a bottom view of the pole-changer; Fig. 11, Plate 4, a top view of the interior of the dome, the cap of the latter and its attachments being removed; and Fig. 12, Plate 4, a bottom view of the cap and its attachments. Plate 5 is a plan view, chart, or diagram, more fully showing the connection between the different parts of the instruments, and the relation of the circuits and instruments to each other and to the batteries.

Like letters of reference indicate like parts.

The object of my invention is to improve the construction and operation of that class of printing-telegraph instruments shown and described in Letters Patent of the United States of America, No. 132,907, dated November 12, 1872, and issued to me for the improvements therein set forth. For the purpose of accomplishing this object my present invention consists in certain novel features relating to the construction of various parts of the instruments, and to the arrangement of the circuits, substantially as hereinafter set forth.

In the drawing, A, Fig. 10, Plate 4, represents the pole-changer. B is a metallic cross-bar or plate, to which various parts of the pole-changer are attached. $a$ is a slot or opening in the central part of this bar. B' is an insulating-block, attached to the bar B, and arranged substantially as shown with relation to the opening $a$. $a'$, $a''$, $e$ and $e'$ are platinum-pointed screws passing through the block B' and insulated from the bar A. The points of these screws are arranged substantially as shown with relation to each other. $c$ and $c'$ are German - silver springs attached to the type-wheel lever and arranged to extend between the points above referred to in the manner shown. These springs are carried from one pair of points to the other by the oscillation of the lever. The bar A is attached to that part of the frame which supports the type-wheel magnets. C is the type-wheel shaft. The outer end of this shaft is screw-threaded, or made in the form of a worm, as is clearly shown at D, Figs. 2 and 4. E is a bent arm, and E' is a pin arranged horizontally below the shaft D. The arm E is loosely mounted on the pin E'. One end of the arm E engages the worm on the shaft C, and the other is provided with a non - conducting wedge-shaped block, as shown in Figs. 1, 2, 4, and 5. F is a spring exerting a pressure against the arm E, and tending to move it from the end of the pin E'. F' is a spring holding the arm E to its engagement with the worm on the shaft C. G is an arm carried by the printing-pad mechanism, and arranged to release the arm E from its engagement with the worm when the printing-pad is thrown upward. H H' are German-silver springs, and H'' is an insulator-block, to which they are attached. These springs are each provided with a platinum point, $h$ and $h'$, arranged for contact with each other when the springs are not separated by the insulating-block. The rotation of the shaft C carries the arm E toward the springs H H', owing to the engagement of the arm with the worm, and if the arm G does not release this engagement before the arm E reaches the end of the worm, the forward end of the latter arm, which by this time is directly above the springs H H', will fall between the said springs, forcing them apart sufficiently to separate the points $h$ and $h'$ from each other, the spring F' operating with sufficient force to draw down the arm E until this separation is made. The next upward movement of the arm G releases the arm E from the springs H H', and the latter arm is then returned to its original position by means of the spring F.

I is the polarized relay. This device is insulated from the frame of the instrument, and is in all respects like the corresponding device shown and described in the Letters Patent hereinbefore referred to. I' is a Morse armature arranged to operate in connection with the polarized relay. J J are soft-iron pieces attached to the poles of the magnets of the polarized relay. K is a pivoted arm, to which the Morse armature is attached. $k$ is a platinum pin passing through the free end of the arm K. L is an arched piece insulated from the frame of the machine. $l$ is a platinum-pointed screw entering the piece L, and having its point arranged directly above the pin $k$. $n$ is a platinum point arranged directly below the pin $k$, and connected, in the primary instrument, with the point $h'$ by a shunting-wire, $n'$, but in the secondary instruments the point $n$ is connected with the press-magnets $p\,p$.

When the line is at rest, the main circuits stand as follows: The + or positive current of the main battery (see chart) enters binding-post No. 1 of the instrument No. 1, which is the main or primary instrument. From said post this current passes to the points $a'$ and $e'$ of the pole-changer, and through the spring $c$ to the sunflower-spring $d$. From the spring $d$ it passes through the segment of the sunflower, and through the cable to the keys, and along the key-straps to the starter-key $h''$. From the key $h''$ it passes through the magnet $i$ of the polarized relay, and through the magnet $i'$ to post No. 4, and thence to the ground. The — or negative current of the main battery enters the same instrument at post No. 2; thence it proceeds to the points $e$ and $a''$, and through the spring $c'$ to post No. 3, and from the latter to the line, and over the line to instrument No. 2, (which is a secondary instrument,) entering at post No. 9. From post No. 9 it passes to the sunflower-spring of that instrument; thence through the segments of the sunflower of instrument No. 2, and the cable thereof, to the keys on the same instrument, and along the key-straps thereof to the starter-key on the latter instrument. From this key it passes through the magnet $i'$ of the polarized relay on the same instrument, and through the magnet $i$ thereof to post No. 10, and thence to the ground, meeting there the + current.

When the line is at rest the circuit of the main battery is closed, and the upper points of the pins $k\,k$ are held against the points $l\,l$, and the armatures of the polarized relays lie against the points $m\,m$. The points $h$ and $h'$ are separated from each other, and the circuits of the local batteries are open at those points and at the points $n\,n$. The course of the locals will subsequently appear.

In order to set the instruments in action, the starter-key in any instrument is depressed. The pins $k\,k$ in all the instruments in the line then fall from the points $l\,l$ to the points $n\,n$, for the reason that the main circuit is then broken.

The local circuit in instrument No. 1 will now be as follows: The + pole of the local battery enters the instrument at post No. 5, and the + current passes through the printing-magnets $p\,p$ to the pin $k$, and thence to the point $n$, when the said pin and point are in contact. From the point $n$ it passes to the wire of the type-wheel magnets $q$ and $q'$, and through the magnets $q'$ to the point $m$. From the point $m$ it passes through the relay-armature and onward to the — pole. This is the first step. Second step: On removing the pressure from the starter-key, the main circuit is again closed, and the points $k\,n$ are brought in contact with each other. The + local current in instrument No. 1 is now from post 5 through points $h\,h'$ to the wire connecting the magnets $q$ and $q'$. From thence it passes alternately through the points $m$ and $m'$ (according to which one is closed on the polarized armature-point) to the polarized armature, and thence to the — pole of the battery. The to-and-fro movement of the type-wheel-magnet armature and lever propels the type-wheel forward by a step-by-step movement, carrying the points of the sunflower-spring $d$ over the sunflower-segments, and thereby switching the main currents through all the wires connected therewith to the several keys. If, during this movement, one of the other keys be depressed, the main current will be broken at that point, and as soon as the spring $d$ reaches a segment corresponding to that key, the Morse armature-lever drops, breaking the local circuit through the points $l$ and $k$, and closing it through the points $k$ and $n$, thus sending a current through magnets $p\,p$ and operating the press-lever, thereby printing the presented letter, it being understood that the key now referred to should be depressed before the starter-key is released. The points $h$ and $h'$ are arranged in the type-wheel circuit, the latter point being connected to the wire of the type-wheel magnets and to the point $m'$, and the former to the wire of the printing-magnets, as shown. The point $l$ is connected to post 5, as shown.

The local circuits in the other instruments lie as follows: Entering at post No. 7, one passes through the printing-magnets to the point $n$; from the pin $k$, when $n$ and $k$ are in contact, it passes to the — pole of the local battery, as shown. The point $h$ is connected to the wire passing from post No. 7 to the printing-magnets, and the point $h'$, in the same instruments, is connected to the type-wheel magnets. The type-wheel magnets are connected to each other and to the polarized relay in the same manner that the corresponding magnets are in instrument No. 1, but the polarized armature is electrically connected to the point $l$ in instrument No. 2, and the Morse armature, when magnetized, brings the polarized armature into the local circuit. The pin $k$ and point $l$ are connected by a resistance-coil, $r$, as shown, for the purpose hereinafter set forth.

The contact of the pins $k\ k$ and points $n\ n$ closes the local circuit through the printing-magnets, and the passage of the current through the latter actuates the printing-pad mechanism, and raises the insulator-block on arm E from between the springs H and H', thus allowing the points $h$ and $h'$ to come in contact with each other. The arm E at the same time moves back to such a position on the worm which it engages that three consecutive revolutions, after the keys are at rest, of the type-wheel will be required in order to again separate the points $h$ and $h'$ on instrument No. 1. The contact of the points $h$ and $h'$ corresponds in result to taking off the shunt in the manner described in the patent herein referred to. In other words, the type-wheel magnets $q'\ q'$ are thus thrown into the local circuit at the same time the magnets $y\ y$ are. When the points $h\ h'$ meet, the magnets $q\ q$ are also brought into this circuit, but are inactive for the reason that this circuit is open at the points $m'$. The armature on the type-wheel lever is thus drawn to the magnets $q'\ q'$, and the springs $c$ and $c'$ are carried to the points $e$ and $e'$ of the pole-changer, and as soon as the starter-key is released the main current will be closed, and the armatures of the polarized relays pass to the point $m'$. The pin $k$ is also lifted from the point $n$, and carried to the point $l$, and the main current runs reversely from its original direction. This shunts the magnets $p\ p$ and $q'\ q'$, and the type-wheel lever is carried to the magnet $q\ q$, thus again reversing the main current, and producing a continuous vibration of the type-wheel lever so long as the points $h$ and $h'$ remain together, and until the circuit is broken by depressing one of the other keys in the manner described in the Letters Patent hereinbefore referred to. The manner of transmitting a message is also the same as described in the said Letters Patent.

When the message has been transmitted all the keys are released. The type-wheel of the main instrument then makes three revolutions before the "tomahawk" returns. In other words the type-wheel magnets $q\ q'$ are thus thrown into the local circuit and the printing or press magnets shunted out. Now, on releasing the starter-key the main circuit will be closed, the direction of the current reversed, the polarized armature will close the local circuit on the point $m'$, and the magnets $q'\ q'$ will be charged, the attraction of which will operate the pole-changer and carry the springs $c$ and $c'$ to the points $e$ and $e'$. The resistance through the type-wheel magnets is then so great that most of the current passes through the printing-magnets, thus giving the most magnetism to the latter at the moment of printing, but leaving enough in the type-wheel magnets to hold the type-wheel lever in place.

After the message is transmitted the type-wheels in the secondary instruments make only two revolutions before the points $h$ and $h'$ thereon are separated, thus stopping the type-wheels on said instruments at the same letter at which the type-wheel on the main instrument stops after making three revolutions. By this means all the type-wheels are kept in unison. The local circuits are kept open when not needed, and the instruments are automatically stopped when not in use.

With the exceptions now herein set forth, and with the exception of some immaterial changes in the arrangement of some of the parts, the construction and operation of all instruments are alike, and are the same (with the exceptions above referred to) as shown and described in the Letters Patent herein cited.

Having thus described my invention, what I claim as new, and desire to secure by Letters Patent, is—

1. In a printing-telegraph instrument, the separable and yielding points $h$ and $h'$, one in constant electrical connection with the press-magnets and one pole of the battery, and the other in like connection with the other pole and the type-wheel magnets, in combination with a yielding separator or circuit-breaker, controlled substantially as specified, for the purposes set forth.

2. The combination of the polarized relay I, having its helices in the main circuit, the points $m$ and $m'$ on opposite sides of corresponding points on the polarized armature, the Morse armature I', and its lever, provided with the points or pin $k$, and actuated by the relay-magnet, and the points $l$ and $n$ on opposite sides of the pin $k$, these several points being arranged in the circuit of the local battery, substantially as and for the purposes specified.

3. In combination, substantially as described, the separable points $h$ and $h'$, arranged in the circuit of the type-wheel magnets, an automatic circuit-breaker operating in connection with the said points, the separable points $k$ and $n$ arranged in the circuit of the printing-magnets, and controlled by the main current, all operating together in a printing-telegraph instrument for the purpose of leaving the local circuits broken when the instrument is at rest.

4. The main-battery circuit or wire carried to the diagonal insulated points of the pole-changer, in combination with the insulated tongues attached to the type-wheel lever, one of the said tongues being electrically connected to the sunflower of the primary instrument, and the other to the sunflower of the secondary instruments, substantially as specified, and for the purposes set forth.

5. The pole-changer A, consisting of the insulated points $a'\ a''$, $e$, and $e'$, in combination with the type-wheel lever provided with the insulated springs $c$ and $c'$, all arranged substantially as specified, with relation to each other and the circuits, for the purposes set forth.

6. The sliding, yielding, and vibrating arm E, provided with a wedge-shaped insulator-block on one end, and engaging at the other end a screw or worm on the type-wheel shaft, in combination with the yielding points $h$ and $h'$, arranged in the type-wheel circuit, and with a releasing-arm carried by the printing mechanism, substantially as and for the purposes set forth.

7. The combination of the polarized relay and the Morse armature, in connection with the points $l$ and $n$ arranged in the local circuit, substantially as and for the purposes specified.

ELISHA GRAY.

Witnesses:
  F. F. WARNER,
  N. C. GRIDLEY.